Figure 7:
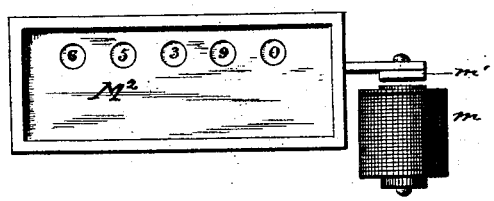

(No Model.)  3 Sheets—Sheet 1.
H. HOLLERITH.
APPARATUS FOR COMPILING STATISTICS.
No. 395,783. Patented Jan. 8, 1889.
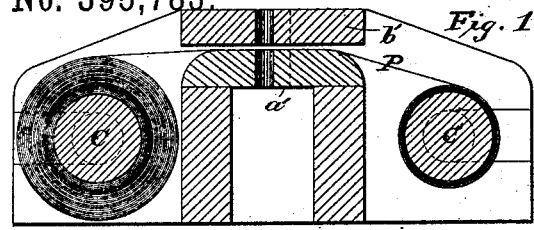
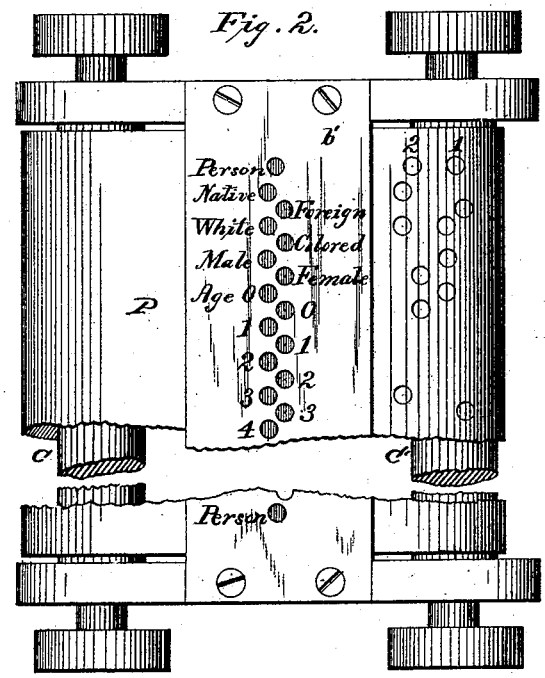
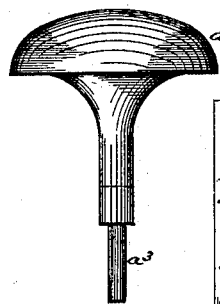
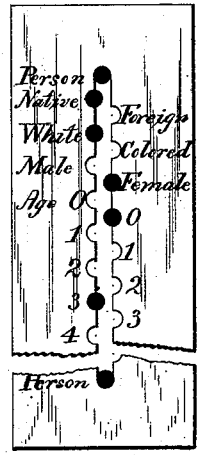
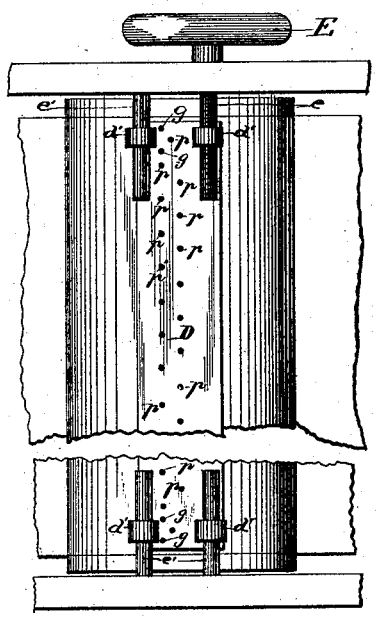
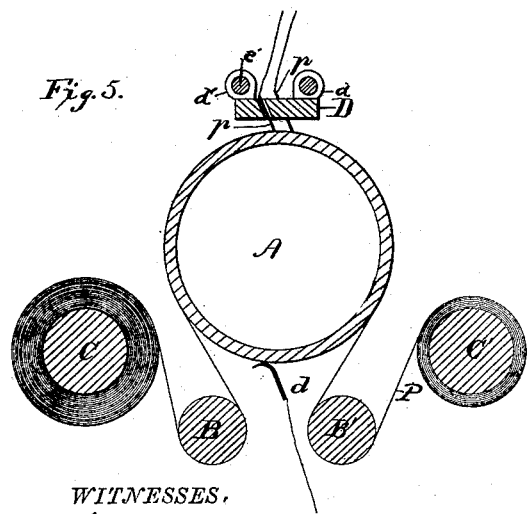
WITNESSES:
Chas. R. Burr
A. F. Stuart
INVENTOR
Herman Hollerith (No Model.)  3 Sheets—Sheet 2.

H. HOLLERITH.
APPARATUS FOR COMPILING STATISTICS.

No. 395,783.  Patented Jan. 8, 1889.

WITNESSES  
Chas. R. Bull  
A. J. Stuart

INVENTOR  
Herman Hollerith (No Model.)

3 Sheets—Sheet 3.

H. HOLLERITH.
APPARATUS FOR COMPILING STATISTICS.

No. 395,783. Patented Jan. 8, 1889.

Witnesses.
Chas. R. Burr.
A. G. Stewart.

Inventor.
Herman Hollerith
by Church & Church
his Attorneys.

UNITED STATES PATENT OFFICE.

HERMAN HOLLERITH, OF NEW YORK, N. Y.

APPARATUS FOR COMPILING STATISTICS.

SPECIFICATION forming part of Letters Patent No. 395,783, dated January 8, 1889.

Application filed September 23, 1884. Renewed October 27, 1885. Again renewed January 4, 1887. Again renewed September 8, 1888. Serial No. 284,939. (No model.)

*To all whom it may concern:*

Be it known that I, HERMAN HOLLERITH, a citizen of the United States, residing at New York city, in the county and State of New York, have invented certain new and useful Improvements in Apparatus for Compiling Statistics, of which the following, together with the accompanying drawings, forms a specification.

This apparatus or system is applicable to the compilation of such statistics as the population-statistics of a census, or the statistics of registration of births, deaths, and marriages, which are compiled by counting or adding single units as persons in the above.

Although applicable to various kinds of statistics, I will describe my invention as applied to the compilation of the population-statistics of a census.

The returns of a census contain the names of individuals and various data relating to such persons, as age, sex, race, nativity, nativity of father, nativity of mother, occupation, civil condition, &c. These facts or data I will, for convenience, call "statistical items," from which items the various statistical tables are compiled. In such compilation the person is the unit, and the statistics are compiled according to single items or combination of items. Thus it is required to know the number of persons returned as whites, colored, males, females, or as carpenters, blacksmiths, &c., or as born in certain States or foreign countries. In such cases single items are counted. Again, it is required to know the number of native whites or of native white males of given ages, or of groups of ages, &c., as in what is technically known as the "age and sex tally;" or it may be required to know the numbers of persons engaged in certain occupations, classified according to sex, groups of ages, and certain nativities. In such cases persons are counted according to combinations of items. A method for compiling such statistics must be capable of counting or adding units according to single statistical items or combinations of such items. The labor and expense of such tallies, especially when counting combinations of items made by the usual methods, are very great.

The object of my invention is to provide an apparatus or system which will reduce the labor necessary in the compilation of such statistics, which will increase the rapidity of making complicated tallies, and which will insure accuracy. In other words, the object of my invention is to generally facilitate the compilation and increase the scope of such statistics.

The apparatus or system hereinafter described and claimed is designed more especially for carrying into execution a new method devised by me, and embodied in a separate application filed October 27, 1885, Serial No. 181,104, and renewed September 8, 1888, Serial No. 284,938.

This method consists of several successive steps: first, the returns are transcribed to a strip or sheet of paper or other suitable electrically non-conducting material, each statistical item being recorded by a hole or a combination of two or more holes punched through the paper or equivalent material in certain relative positions; second, verifying the accuracy of such transcription; third, counting the number of times certain statistical items or combination of items are reported by electro-mechanical means.

Figure 8:
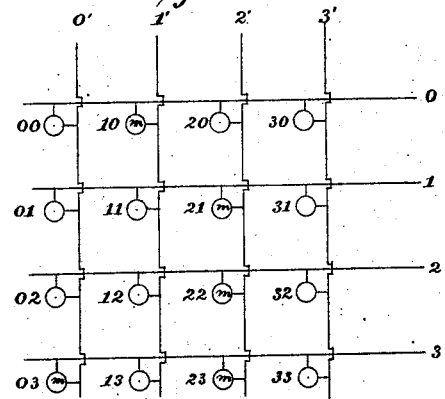
Figure 9:
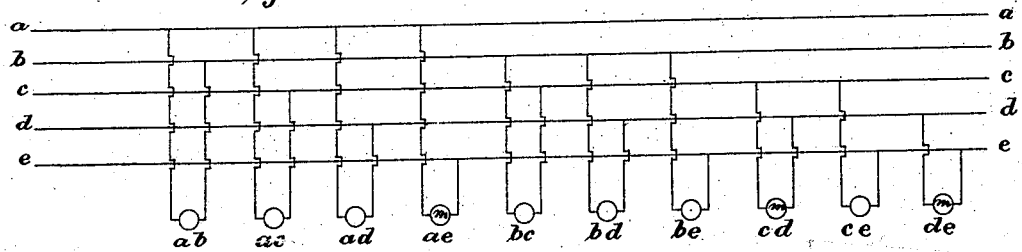
Figure 10:
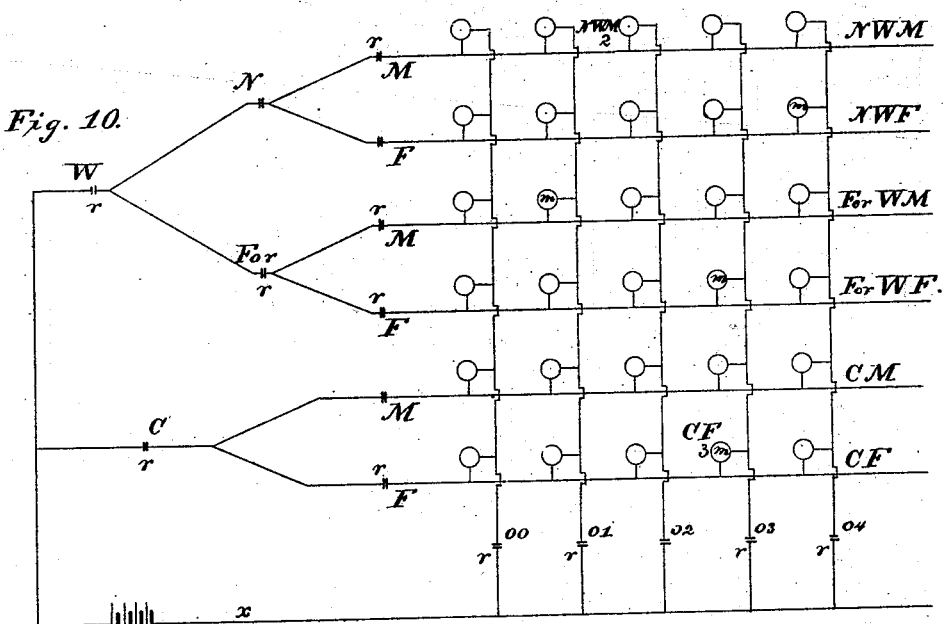
Figure 11:
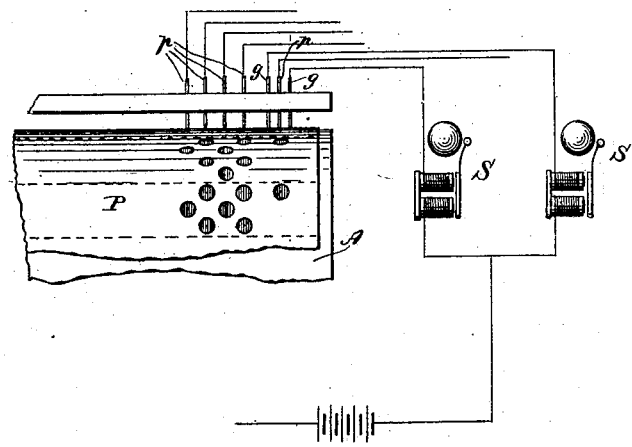
Figure 12:
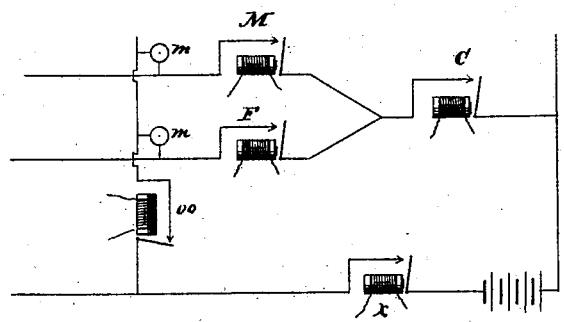

In the accompanying drawings, Figure 1 represents a transverse section of the apparatus used for perforating the strip of paper used in transcribing the returns. Fig. 2 represents a part plan view of the same. Fig. 3 represents a tool used in connection with the above apparatus for perforating the paper. Fig. 4 represents a scale used for verifying the transcription of the returns. Fig. 5 represents a transverse section of the counting apparatus. Fig. 6 represents a part plan view of the same. Fig. 7 represents an electro-mechanical counter used in connection with the counting apparatus illustrated in Figs. 5 and 6. Figs. 8, 9, and 10 are diagrams showing the arrangement of wires and electrical connections for making the various tallies. Fig. 11 is a side elevation of a portion of one end of the drum, perforated strip, and contact-points, showing application of signal-circuits. Fig. 12 is a diagrammatic view illustrating a portion of the circuit arrangement, Fig. 10.

The transcription of the returns to the sheets of electrical non-conducting material can be made in various ways. I prefer to use a strip of paper, P, which is passed from one roller to another over a die-plate, as shown in Figs. 1 and 2. The die-plate $a'$ is provided with a series of holes, placed staggering, extending across the width of the paper strip, as shown in plan in Fig. 2. Above the die-plate $a'$ is the guide-plate $b'$, provided with holes corresponding to the holes in the die-plate $a'$. With a tool consisting of a plain punch, $a^3$, provided with a suitable handle, $a^4$, as shown in Fig. 3, holes can be punched in the strip of paper in suitable relative positions according to the holes in the guide-plate $b'$ and die-plate $a'$. The holes are suitably lettered or numbered on the guide-plate $b'$, as shown in Fig. 2. At the extreme end is a hole marked "persons," separate somewhat from the remainder, the object of which will hereinafter be more fully explained. The paper strip is drawn to a certain position when the various statistical items for a given person are recorded by punching suitable holes in a line across the strip, being guided by letters on the guide-plate. A hole is thus punched corresponding to "person;" then a hole according as person is a male or female; another recording whether native or foreign-born; another, either white or colored, &c. There are about one hundred ages to be recognized. To facilitate this, two holes are used to record each age, there being two sets of ten holes each, marked from 0 to 9, respectively. Thus 0-0 would represent less than one year of age, 0-1 one year of age, 1-0 ten years, &c.

The occupations can be recorded by using a series of holes suitably lettered, each occupation being recorded by a combination of two holes. Thus, $ab, ac, bc$, &c, would each represent a single given occupation, according to a prearranged schedule. With twenty-six holes in this way three hundred and twenty-five combinations could be made, the number of combinations possible following the well-known mathematical law of combinations.

There are thus three ways in which statistical items can be recorded: first, by single holes, (as above described for recording sex, race, &c.;) second, by combinations of two holes, each hole being in a different set, (as described above for recording ages;) third, by combination of two holes, both holes being in the same set, (as described above for recording occupations;) or combinations of these methods can be followed.

It is necessary in case of census-statistics to use combinations of holes on account of the larger number of statistical items to be recognized. When the various statistical items relating to one person have been thus recorded or transcribed, the paper strip P is drawn forward and the items or data relating to the next person are recorded, any suitable system of notation being used to identify each transcription. In Fig. 2 is shown a practical record for two persons, numbered 1 and 2, respectively. No. 1 is the transcription for a foreign-born white male three (0-3) years of age, while No. 2 is the transcription of a native white female thirty (3-0) years of age. When the various items have been thus transcribed, it may be desirable or necessary to verify, entirely or in part, the accuracy of such transcription. For this purpose a scale of card-board, thin metal, or other suitable material may be used, arranged as shown in Fig. 4, it being lettered and numbered corresponding with the guide-plate of punching apparatus. This scale is placed across the paper strip, being located in position by the holes marked "person" at each end. The transcription for the given person can thus be read according to the location of the holes. Any errors can now be corrected by punching holes in proper places and covering all holes wrongly punched by small seals of paper or other suitable electrically non-conducting material.

When the transcription for a certain district has been made and verified, as above described, the strip is passed through a counting-machine, in which the separate items or combination of items are counted or tallied. This counting-machine can be constructed in various ways. The construction which I prefer consists, essentially, of a metallic drum or cylinder, A, Fig. 5, over which the strip of paper P is passed from a roller, C, to a roller, C', around suitable guide-rollers, B B'. Above the metallic drum A, extending across the machine, is the bar D, Figs. 5 and 6, supported by lugs $d'$ from pins $e e'$ at each end, one of which pins, $e$, is provided with a screw-thread engaging with screw-thread in corresponding lug, $d'$, and is connected with wheel E, by means of which the bar D can be given a slight lateral motion. Passing through the bar D, and suitably insulated from each other, are the metallic pins or pointers $p$. These pins are arranged in relative positions corresponding to the centers of the holes in the die-plate $a'$, Fig. 1. The pointers or pins $p$ press against the drum A, and, together with the drum A and metallic brush $d$, can each be made part of an electric circuit. In an electric circuit with each pointer can be placed an electro-magnet, $m$, Fig. 7, the armature $m'$ of which is attached to a lever operating any suitable mechanical counter—such, for example, as are used for registering the revolutions of a steam-engine—as shown at $M^2$ in Fig. 7. If the paper is now drawn through the counting-machine, the circuit through any given pointer $p$ is closed and broken each time a hole in the paper strip passes under the pointer, the armature of the magnet being attracted when the circuit is closed and withdrawn by the spring of the counter when the circuit is broken, thus registering one for each hole. In this way when the strip corresponding to any given district has been drawn through the apparatus counters arranged as above described will show the numbers of males, of females, &c., reported in that district. In this work a difficulty might be experienced, as the paper strip is liable to move or shift gradually from one side to the other of the drum A while being drawn through the apparatus. To allow for this, two pointers, $g$ $g$, are placed at each end of the bar D, Fig. 6. These pointers are so placed that when the bar D is in proper position relatively to the holes in the paper strip the pointers $g$ $g$ will constantly be over the paper just to either side of the holes corresponding to persons. Each pointer $g$, together with the drum A, is put in circuit with a suitable electric bell, S, as shown in Fig. 11. Should the paper shift to either side, the circuit would close through one of the pointers, ringing the corresponding bell. The bar D can be then shifted to one side or the other by means of the wheel E, according to which bell rings.

By the above method of course only items recorded by single holes can be counted. To count items recorded by combinations of two holes, each hole being in a different set, as in recording age, as above described, the arrangement shown in Fig. 8 is followed, in which 0' 1' 2', &c., represent wires connected with corresponding pointers of first set of holes, or tens of age, while 0 1 2 3 represent wires connected with corresponding pointers of second set, or units of age. The electro-magnets $m$ of the counters are placed as shown by the small circles. The wire marked 0' is connected with magnets 00, 01, 02, &c., while wire marked 0 is connected with magnets 00, 10, 20, 30, &c., as shown. If, now, a hole in the paper strip comes under the pointer 1' and another hole at the same time comes under pointer 2, the circuit would be closed through electro-magnet 12 and corresponding counter would register. Should a hole, however, come under pointer 2' and another under pointer 1, the circuit would be closed through magnet 21, and its corresponding counter would register. In this way a counter can be arranged for each age.

The method followed when counting combinations of two holes, both holes being in the same set, is shown in Fig. 9. Five wires, $a$ $b$ $c$ $d$ $e$, are represented, each wire being connected with a corresponding pointer. Electro-magnets $ab$, $ac$, $ad$, &c., are shown, one for each combination connected with the corresponding pointers. From an inspection of the drawings it will be seen that should the two holes come under pointers $a$ and $b$, the circuit would be closed through the electro-magnet $ab$ and corresponding counter, and only this counter would register, for the direct circuit through any other magnet would remain open. Should the holes come under pointers $a$ and $c$, the circuit would be closed through the magnet $ac$, &c.

It will be seen that by the above methods any combination of two holes can be counted or tallied. In statistical work, however, it is often desirable to tally by combinations of more than two holes or items—as, for instance, in the age and sex tally. Here we must combine age with race, sex, and nativity. Thus, in the tenth census of the United States single ages were tallied under the following six classes: first, native white males; second, native white females; third, foreign white males; fourth, foreign white females; fifth, colored males, and sixth, colored females. For such purposes I use secondary circuits for the electro-magnets of the counters, which circuits are controlled by the electro-magnets of ordinary telegraph-relays or other suitable apparatus in circuit with the pointers $p$ of the counting-machine.

For an age and sex tally the arrangement is shown in Fig. 10. The electro-magnets $m$ of the counters are arranged in circuits, as shown, these circuits being broken by relays $r$, which are connected in circuits with corresponding pointers, $p$, of the counting apparatus. Relays W and C are connected with pointers corresponding to white and colored, respectively; relays N and F or with pointers corresponding to native and foreign born, and relays M and F with pointers corresponding to male and female, while relays 0 0, 01, 02, &c., one for each age are connected with the pointers representing the ages in same way as the magnets shown in Fig. 8. Let us suppose the record corresponding to a native white male of two years of age passes under the pointers $p$. Relays W, N, M, and 02 would then close the circuit through magnet N W M 2 and the corresponding counter would register. If the record corresponding to a colored female of three years of age passes under the pointers $p$, the relays C, F, and 03 would then close the circuit through magnet C F 3, thereby registering one on the proper counter. In this way, by suitable arrangements of magnets in circuits which are broken by relays operated by circuits through pointers $p$, any desirable combinations of statistical items can be counted or tallied.

Various modifications of the above methods of carrying out my invention may be used. Thus, instead of punching a strip of paper, a perforated strip may be used, in which all but the required perforation could be covered by pasting over them strips of paper, as shown, for example, in my application, Serial No. 240,629. Again, instead of a single hole representing a single item, it could be used to represent a combination of items. Thus one hole might represent native white males, another white females, &c.

It may sometimes be desirable to count groups of single items, as groups of ages or groups of occupations, &c. This can of course be done by placing a single magnet in several circuits.

If, on account of the large number of items to be recorded, a strip of paper too wide to be conveniently handled would be required, when using a single row of holes, two or more rows of holes could be used in all lines, except that corresponding to "persons," and the pointers of the counting-machine arranged correspondingly. A relay placed in the circuit shown in Fig. 10 at $x$ (see Fig. 12) could be controlled by the hole corresponding to persons in such manner that the circuit through the electro-magnets $m$ could only be closed when the holes were under their corresponding pointers.

The counters could of course be constructed in many different ways.

It is evident that by modification of the apparatus hereinbefore described cards or sheets of electrically non-conducting material, suitably perforated, could be used instead of the strip of paper, as described. In such case the drum A would be replaced by a flat plate which would be made to press against a series of pointers connected with counters, in the same manner as hereinbefore described. This card would be placed in position over these pointers, and the plate then pressed against the pointers, in which case the circuits would be closed through proper magnets and the corresponding counters would register, an illustration of which is given in my application, Serial No. 240,629.

What I claim as new, and desire to secure by Letters Patent, is—

1. The combination, with perforated sheets of electrically non-conducting materials, said perforations representing statistical items, of electro-magnets and mechanical counters in circuits controlled by said perforated sheets, substantially as and for the purposes specified.

2. The combination, with a series of mechanical counters, as described, and a perforated strip of paper, said perforations representing statistical items, of the drum A, bar D, provided with pointers $p$, and electro-magnets $m$, said electro-magnets being in circuits through the pointers $p$ and connected with and operating the before-mentioned mechanical counters.

3. The combination, with a series of electro-magnets and the series of mechanical counters actuated thereby, said electro-magnets being arranged in circuits controlled by relays, of a perforated sheet of electrically non-conducting material, said perforations representing statistical items controlling the circuit through the electro-magnets, of the relays above referred to, substantially as and for the purposes described.

4. The combination, to form a system for automatically compiling and recording statistics, of a strip of non-conducting material perforated at intervals to designate separate items, grades, &c., pertaining to a single individual or object, a series of electric circuits, contact-fingers, or terminals in each of said circuits to vary the current in said circuits as each perforation registers with the corresponding contact-finger, and a recording mechanism for each item, grade, &c., operated by an electro-magnet included in a circuit whose current is thus varied by the contact finger or fingers entering the perforation or perforations in the strip representing the item to be recorded, substantially as described.

5. In a system such as described for automatically compiling and recording statistics, the combination of a series of independent mechanical counters for recording the separate items, an electro-magnet for actuating each of said counters, a series of electric circuits including said electro-magnets, a series of contact-fingers controlling said circuits, and a strip perforated at predetermined intervals denoting separate statistical items, each of said perforations being located in line with and actuating one of the said contact-fingers, whereby each perforation in the strip representing an item, quality, &c., is caused to actuate a contact-finger and thereby energize the electro-magnet whose circuit is controlled by the finger or fingers representing the item to be recorded on the mechanism actuated by the said electro-magnet.

6. In a system such as described for automatically compiling and recording statistics, the combination, with a series of electric circuits, a series of electro-magnets connected thereto, a recording mechanism for each electro-magnet, and a series of circuit-breakers controlling the flow of electricity in the before-mentioned circuits, of a movable record-strip provided with a series of indicating-points representing statistical items for actuating the circuit-breakers, whereby each item or combination of items represented upon said record-strip is automatically distributed and recorded, substantially as described.

7. In a system such as described for automatically compiling and recording statistics, the combination, with a series of recording-instruments, a series of electro-magnets for actuating said recording-instruments, a series of electric circuits including said electro-magnets, and a series of circuit-breakers for controlling said circuits, of a record-strip containing a series of indicators for actuating the circuit-breakers, said indicators each representing separate items characteristic of the person or thing, the whole so combined and arranged, substantially as described, whereby each item or series of items pertaining to each individual is recorded under its appropriate head as a statistical item.

HERMAN HOLLERITH.

Witnesses:
FRANCK D. JOHNS,
JNO. M. HENDERSON.